(12) United States Patent
Ferreira et al.

US011006263B2

(10) Patent No.: US 11,006,263 B2
(45) Date of Patent: May 11, 2021

(54) VEHICLE-INTEGRATED DRONE

(71) Applicant: Ford Global Technologies, LLC, Dearborn, MI (US)

(72) Inventors: Francisco Javier Ferreira, Atizapna de Zaragoza (MX); Gerardo Velazquez Monroy, Nicolas Romero (MX); Joan Manuel Hernandez, Mexico City (MX); Erick Garcia Dominguez, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 16/315,314

(22) PCT Filed: Jul. 7, 2016

(86) PCT No.: PCT/US2016/041230
§ 371 (c)(1),
(2) Date: Jan. 4, 2019

(87) PCT Pub. No.: WO2018/009190
PCT Pub. Date: Jan. 11, 2018

(65) Prior Publication Data
US 2019/0313228 A1    Oct. 10, 2019

(51) Int. Cl.
*B64D 47/04*       (2006.01)
*H04W 4/90*        (2018.01)
(Continued)

(52) U.S. Cl.
CPC .............. *H04W 4/90* (2018.02); *B64C 39/024* (2013.01); *B64D 47/02* (2013.01); *B64D 47/04* (2013.01);
(Continued)

(58) Field of Classification Search
CPC ......... H04W 4/90; H04W 4/44; H04W 4/029; B64C 39/024; B64C 2201/027;
(Continued)

(56) References Cited

U.S. PATENT DOCUMENTS 9,056,676 B1    6/2015  Wang
2009/0242693 A1  10/2009  Umes, Sr.
(Continued)

FOREIGN PATENT DOCUMENTS

CN    204415730 U    6/2015
DE   102011106170 A1  2/2012
(Continued)

OTHER PUBLICATIONS

EPO Search Report as issued by the European Patent Office dated Feb. 10, 2020.
(Continued)

*Primary Examiner* — Peter D Nolan
*Assistant Examiner* — Ashley L Redhead, Jr.
(74) *Attorney, Agent, or Firm* — Brandon Hicks; Bejin Bieneman PLC

(57) ABSTRACT

A vehicle system includes a processor and a memory storing instructions executable by the processor, the instructions including receiving an alert signal, deploying a drone from
(Continued)

a host vehicle in response to receiving the alert signal, and commanding the drone to follow the host vehicle and to present a perceptible alert.

20 Claims, 3 Drawing Sheets

(51) Int. Cl.
    *H04W 4/44*     (2018.01)
    *H04W 4/029*     (2018.01)
    *B64C 39/02*     (2006.01)
    *B64D 47/02*     (2006.01)
    *B64D 47/06*     (2006.01)

(52) U.S. Cl.
    CPC ............ *B64D 47/06* (2013.01); *H04W 4/029* (2018.02); *H04W 4/44* (2018.02); *B64C 2201/027* (2013.01); *B64C 2201/08* (2013.01); *B64C 2201/12* (2013.01); *B64C 2201/208* (2013.01)

(58) Field of Classification Search
    CPC ............ B64C 2201/08; B64C 2201/12; B64C 2201/208; B64D 47/02; B64D 47/04; B64D 47/06
    See application file for complete search history.

(56) References Cited

U.S. PATENT DOCUMENTS

| | | | |
|---|---|---|---|
| 2009/0294573 A1 | 12/2009 | Wilson et al. | |
| 2012/0044710 A1* | 2/2012 | Jones | B64C 39/024 362/470 |
| 2015/0140954 A1 | 5/2015 | Maier et al. | |
| 2015/0148988 A1 | 5/2015 | Fleck | |
| 2015/0158513 A1 | 6/2015 | Costa et al. | |
| 2015/0321758 A1* | 11/2015 | Sama, II | B64C 39/024 244/63 |
| 2016/0016663 A1 | 1/2016 | Stanek et al. | |
| 2016/0042637 A1* | 2/2016 | Cahill | H04W 4/029 701/3 |
| 2017/0253330 A1* | 9/2017 | Saigh | B64C 39/024 |

FOREIGN PATENT DOCUMENTS

| | | |
|---|---|---|
| FR | 2986647 A3 | 8/2013 |
| JP | 2006180326 A | 7/2006 |

OTHER PUBLICATIONS

Notification of Transmittal of the International Search Report and the Written Opinion of the International Searching Authority dated Sep. 30, 2016 regarding International Application No. PCT/US2016/041230 (16 pages).

\* cited by examiner

VEHICLE-INTEGRATED DRONE

BACKGROUND

Stranded vehicles are often moved to the side of the road so that they do not impede traffic. The stranded vehicle can be towed to a service station or possibly repaired and driven away. Sometimes, the stranded vehicle is left unoccupied and unattended on the side of the road.

DETAILED DESCRIPTION

Stranded vehicles can sometimes be hard to find. For example, the driver of a service truck (such as a tow truck) may not know what side of the road the stranded vehicle is parked or may not be able to see the stranded vehicle at night or if visibility is low. The same issues arise if the occupant of the vehicle requires emergency services. The emergency service personnel (police officer, fireman, emergency medical technician, etc.) may have difficulty finding the stranded vehicle.

One way to address that problem is with a drone that deploys from, and draws attention to, the vehicle. The drone may hover above the vehicle and shine a light onto the vehicle, turn on a siren, or provide any other type of perceptible alert. The deployment of the drone may be handled by a drone deployment system having a processor programmed to receive an alert signal, deploy the drone from the vehicle in response to receiving the alert signal, and command the drone to follow the host vehicle and to present the perceptible alert. Thus, the drone will draw attention to the host vehicle, making the host vehicle easier for the driver of the service truck or the emergency service personnel to find.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1A:
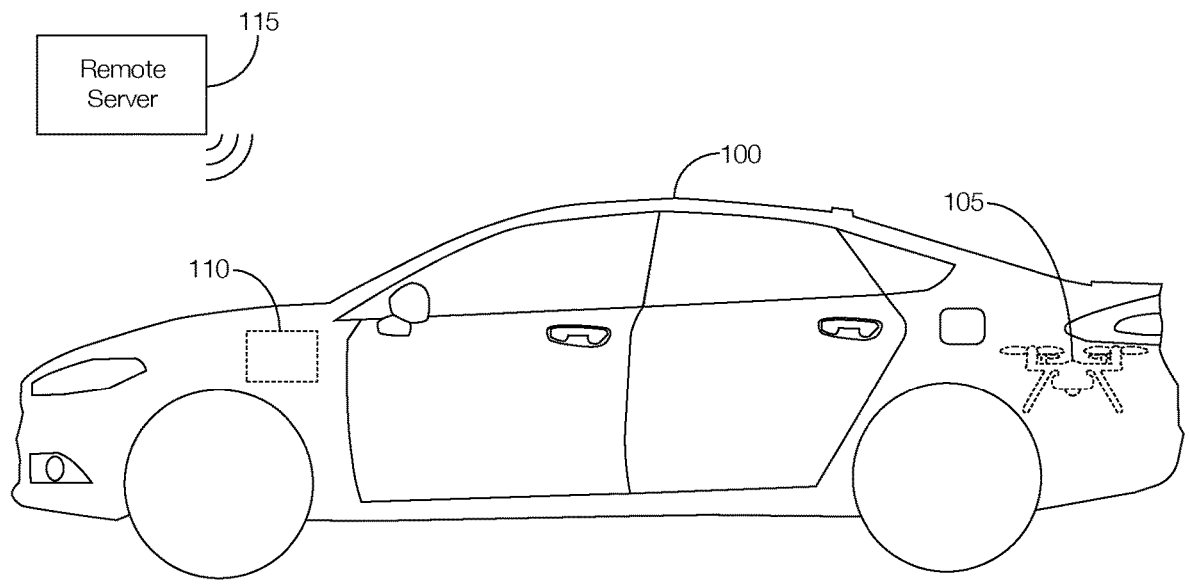
FIGS. 1A and 1B illustrate an example vehicle having a deployable drone and incorporating a drone deployment system.
Figure 1B:
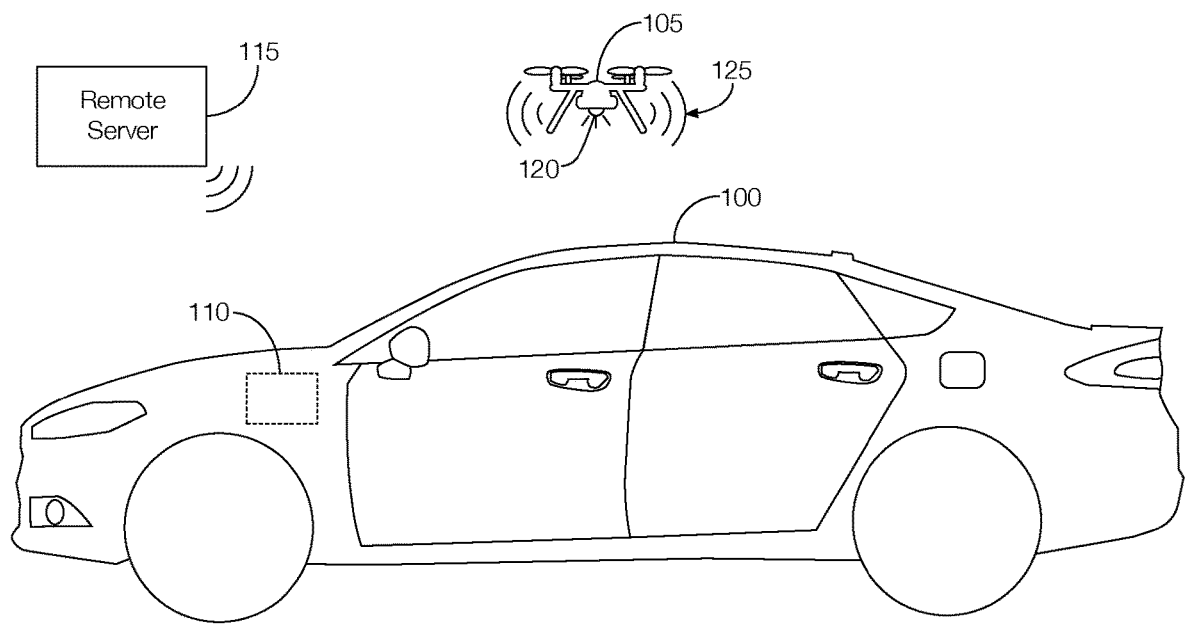

As illustrated in FIGS. 1A and 1B, a host vehicle 100 includes a deployable drone 105 and a drone deployment system 110. Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that can operate in an autonomous (e.g., driverless) mode, a partially autonomous mode, and/or a non-autonomous mode.

The deployable drone 105 is an unmanned aerial vehicle and includes a number of circuits, chips, or other electronic components that can control various operations of the deployable drone 105. For instance, the deployable drone 105 may fly in accordance with control signals output to its propellers. The deployable drone 105 may be outfitted with a navigation system 140 so that it can fly to, and hover at, a particular location. Moreover, the deployable drone 105 may be outfitted with various alert devices such as lights 120, sirens, or both. In some possible approaches, the deployable drone 105 may include one or more cameras that can capture images of an area near the drone. The cameras may be located in the same housing as the lights 120, and the deployable drone 105 may be programmed to turn on the camera to capture images of an area below the deployable drone 105. Thus, when hovering over the host vehicle 100, the camera may capture images of the host vehicle 100 and possibly the area around the host vehicle 100, depending on how far above the host vehicle 100 the deployable drone 105 is hovering.

The deployable drone 105 may be programmed to operate in different modes. Example modes may include a panic mode, a security mode, a static view mode, a monitoring mode, and a fly mode. When operating in the panic mode, the deployable drone 105 may be programmed to hover above the host vehicle 100 while both shining the light 120 onto the host vehicle 100 and its surrounding area and also emitting an audible alert through the siren or a speaker. When operating in the security mode, the deployable drone 105 may be programmed to hover above the host vehicle 100 and shine the light 120 onto the host vehicle 100 and its surrounding area. When operating in the static view mode, the deployable drone 105 may be programmed to hover over the host vehicle 100 with the camera turned on to capture images of the host vehicle 100 and its surrounding area. The deployable drone 105 may be further programmed to stream the video captured by the camera to a user's mobile device. When operating in the monitoring mode, the deployable drone 105 may be programmed to hover over the host vehicle 100 with the camera turned on and pointed toward an object of interest (which may or may not be the host vehicle 100). Further, when operating in the monitoring mode, the deployable drone 105 may broadcast the video captured by the camera to nearby mobile devices or make the video otherwise accessible to a group of mobile devices beyond that of the owner of the host vehicle 100. In other words, operating in the monitoring mode may include the deployable drone 105 presenting a live stream of the video captured by the camera to anyone with permission to view the live stream. When operating in the fly mode, the deployable drone 105 may be programmed to fly to a particular location, at the direction of a user input, and capture images via the camera. The user input may be provided via a user interface (see FIG. 2) located in the host vehicle 100, via a mobile device, or the like.

The drone deployment system 110 is implemented via circuits, chips, or other electronic components that can receive an alert signal from a remote server 115, deploy the deployable drone 105 from the host vehicle 100 in response to receiving the alert signal, and command the drone to follow the host vehicle 100, present a perceptible alert, or both. The drone deployment system 110 may wirelessly communicate with the remote server 115 via any number of telecommunications protocols. For instance, the communication between the drone deployment system 110 and the remote server 115 may be in accordance with cellular or satellite communication protocols, including 3G, 4G, LTE, etc.

To deploy the deployable drone 105 from the host vehicle 100, the drone deployment system 110 may output a control signal to an actuator that, in response to the control signal, opens a door, such as a trunk, of the host vehicle 100 (see FIG. 1A). The same or different control signal may be provided to actuators that release the deployable drone 105 from any number of in-vehicle locks that otherwise secure the deployable drone 105 when it is not in use. Once released from the locks, the commands output to the deployable drone 105 may include a command for the deployable drone 105 to exit the host vehicle 100 (i.e., fly out of the trunk) and hover above the host vehicle 100 (see FIG. 1B). In some instances, the commands may include a command for the deployable drone 105 to follow the host vehicle 100 if, e.g., the host vehicle 100 is moving. Additional commands may include commanding the deployable drone 105 to present a perceptible alert (shining a light 120 in a particular area, turning on the siren, etc.) or commanding the deployable drone 105 to operate in one of the modes discussed above. For instance, one of the commands output to the deployable drone 105 may cause the deployable drone 105 to operate in the panic mode, the security mode, the static view mode, the monitoring mode, or the fly mode.

The drone deployment system 110 may select the operating mode of the deployable drone 105 according to any number of factors including, e.g., the alert signal. For instance, if the alert signal indicates the vehicle owner's desire for the deployable drone 105 to operate in the panic mode, the drone deployment system 110 may select that mode. Since operating in the panic mode includes the deployable drone 105 shining the light 120 and turning on the siren, the selection of the perceptible alert is in accordance with the selected operating mode.

The drone deployment system 110 receives the alert signal from a remote server 115. The remote server 115 may initiate the alert signal in response to a user input, which could include a user input from the owner of the host vehicle 100. The user input may be provided by the owner of the host vehicle 100 to his or her mobile device, computer, etc., and transmitted to the remote server 115 via a wireless communication protocol, including cellular communication protocols, satellite communication protocols, or the like. Alternatively, the user input may be transmitted to the remote server 115 through a wired communication interface if, e.g., the user input is provided to a desktop or laptop computer that at least partially relies on a wired network connection to communicate with remote computing devices. In some instances, the user input may be received via an in-vehicle user interface such as an infotainment system touchscreen incorporated into the host vehicle 100. In such instances, the alert signal may be transmitted from the infotainment system to the processor without an intervening remote server 115.

Rather than a user input, the alert signal may be transmitted in response to a communication from an emergency service provider. For example, the emergency service provider may be associated with a police station, fire station, hospital, ambulance service, vehicle service center, etc. Thus, if the owner of the host vehicle 100 were to call the emergency service provider to report an emergency or otherwise request assistance, the emergency service provider may communicate with the remote server 115 to instruct the remote server 115 to transmit the alert signal to the host vehicle 100, and specifically, to the drone deployment system 110.

The drone deployment system 110 may be programmed to only permit certain modes of operation of the deployable drone 105 based on the origination of the alert signal. For instance, the drone deployment system 110 may permit any operating mode following receipt of the alert signal generated in response to a user input generated by the owner or user of the host vehicle 100. The drone deployment system 110 may, however, only permit the panic mode, the security mode, or the static view mode when the alert signal is generated in response to a communication from the emergency service provide to the remote server 115. In other words, the emergency service provider may not be permitted to transmit an alert signal that will deploy the deployable drone 105 and cause the deployable drone 105 to operate in the monitoring mode or the fly mode.

FIG. 1A illustrates the deployable drone 105 located in the trunk of the host vehicle 100. FIG. 1B illustrates the deployable drone 105 hovering over the host vehicle 100. Also, as shown in FIG. 1B, the light 120 of the deployable drone 105 is illuminated and the siren is turned on (shown by the sound waves 125).

Figure 2:
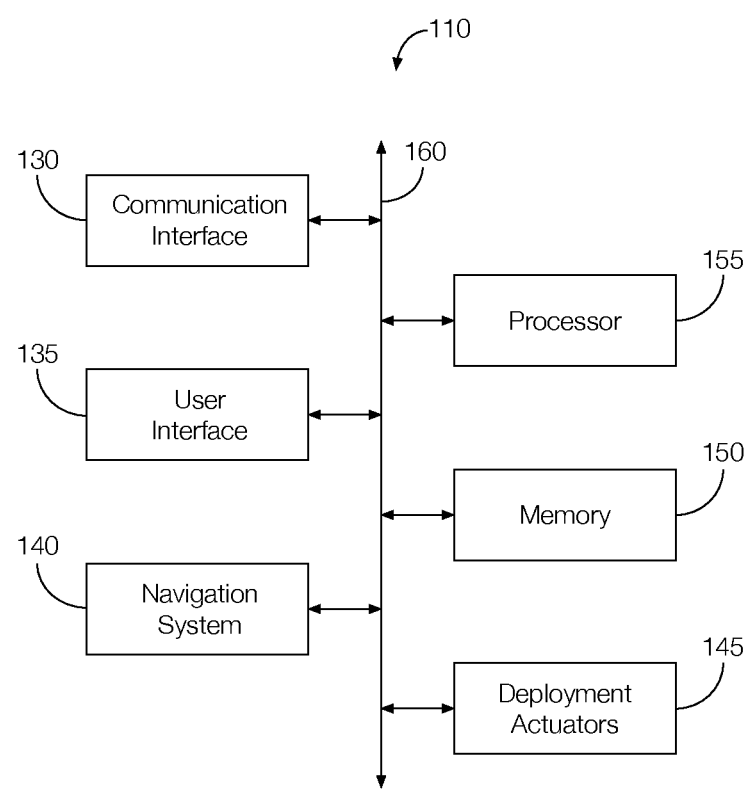
FIG. 2 is a block diagram showing example components of the drone deployment system.

Referring now to FIG. 2, the drone deployment system 110 includes or otherwise works in accordance with a communication interface 130, a user interface 135, a navigation system 140, deployment actuators 145, a memory 150, and a processor 155. These and possibly other components of the drone deployment system 110 or the host vehicle 100 are in communication with one another via a communication network 160, such as a controller area network (CAN) bus, Ethernet, Bluetooth®, Bluetooth Low Energy®, WiFi, or the like.

The communication interface 130 is implemented via circuits, chips, or other electronic components that can facilitate wired or wireless communication with remote devices such as the remote server 115, a user's mobile device, the deployable drone 105, etc. The communication interface 130 may be programmed to communicate in accordance with any number of telecommunication protocols, including cellular or satellite communication protocols. Examples of telecommunication protocols include 3G, 4G, LTE, Bluetooth®, Bluetooth Low Energy®, WiFi, etc. The communication interface 130 may be programmed to transmit messages to, and receive messages from, the remote server 115, a mobile device, etc. The communication interface 130 may be further programmed to forward received messages to, e.g., the memory 150 or the processor 155. Further, the communication interface 130 may generate and transmit messages in accordance with instructions received from the processor 155 or other components of the host vehicle 100, such as the navigation system 140. The communication interface 130 may also be programmed to transmit messages to the deployable drone 105. The messages transmitted to the deployable drone 105 may include instructions from the processor 155, the location of the host vehicle 100 from the navigation system 140, etc.

The user interface 135 is implemented via circuits, chips, or other electronic components that can receive user inputs provided by an occupant of the host vehicle 100. The user interface 135 may include a display screen for presenting information to the user and for prompting the user to provide various user inputs. The user interface 135 may further include buttons for receiving user inputs. In some possible approaches, the user interface 135 includes a touch-sensitive display screen that can present information to the occupant, prompt the occupant for information, and receive user inputs resulting from the occupant touching designated areas (virtual buttons or soft keys) of the touch-sensitive display screen. The user interface 135 may be programmed to output signals representing the user inputs received. The user interface 135 may be incorporated into, e.g., a vehicle infotainment system.

The navigation system 140 is implemented via circuits, chips, or other electronic components that can determine the location of the host vehicle 100 and output signals representing the location of the host vehicle 100. The navigation system 140 may be programmed to determine the location of the host vehicle 100 in accordance with signals received from a satellite system, such as the Global Positioning System (GPS). The navigation system 140 may be further programmed to receive, from the user interface 135, a destination and develop a route from the present location of the host vehicle 100 to the destination. In some instances, the navigation system 140 may be programmed to transmit a signal representing the location of the host vehicle 100 to the communication interface 130 with an instruction to transmit the location to, e.g., the deployable drone 105, the remote server 115, the mobile device, etc.

The deployment actuators 145 are implemented via solenoids or other types of electromechanical devices that convert electric signals into motion. One or more deployment actuators 145 may be used to lock the deployable drone 105 in or to the host vehicle 100 when the deployable drone 105 is not in use. That is, those deployment actuators 145 may be in a locked state while the deployable drone 105 is stored in, e.g., the trunk of the host vehicle 100, and may transition to an unlocked state in response to receiving a control signal output by, e.g., the processor 155. The same or different deployment actuators 145 may be used to release the trunk or other door that allows the deployable drone 105 to exit the host vehicle 100. Thus, in response to control signals output by the processor 155, the deployment actuators 145 may transition to the unlocked state so the deployable drone 105 can be released from, e.g., the trunk and hover above the host vehicle 100.

The memory 150 is implemented via circuits, chips, or other electronic components that can electronically store data. The memory 150 may store instructions executable by the communication interface 130, the user interface 135, the navigation system 140, the processor 155, or any combination of these or other components in the host vehicle 100. The memory 150 may further store data received from any component in the host vehicle 100 and make stored data available to the components of the host vehicle 100.

The processor 155 is implemented via circuits, chips, or other electronic components that can control various operations of the drone deployment system 110. For instance, the processor 155 may be programmed to receive the alert signal. The processor 155 may receive the alert signal via the user interface 135 or the communication interface 130. For instance, the processor 155 may receive the alert signal via the user interface 135 after the alert signal is generated in response to a user input provided to the user interface 135. The processor 155 may receive the alert signal via the communication interface 130 after the alert signal is generated in response to a user input provided to a mobile device or generated by the remote server 115 and wirelessly transmitted to the host vehicle 100.

The processor 155 may be further programmed to output signals to deploy the drone from the host vehicle 100. The signals may be generated and output by the processor 155 in response receiving and processing the alert signal. Deploying the drone from the host vehicle 100 may include the processor 155 outputting control signals to the deployment actuators 145 to switch the deployment actuators 145 from the locked state to the unlocked state. In doing so, the deployable drone 105 may be released from, e.g., the trunk of the host vehicle 100.

Either before or after transitioning the deployment actuators 145 to the unlocked state, the processor 155 may be programmed to transmit various command signals to the deployable drone 105. The processor 155 may transmit the commands to the deployable drone 105 by instructing the communication interface 130 to create a message with the command and wirelessly transmit the message with the command to the deployable drone 105. The processor 155 may be programmed to generate and transmit any number of command signals. For example, the command signals may instruct the deployable drone 105 to operate in one or more of the modes discussed above. For instance, the processor 155 may be programmed to select an operating mode in accordance with the alert signal. That is, if the alert signal indicates a user's desire for the deployable drone 105 to operate in the panic mode, the processor 155 may be programmed to select the panic mode as the operating mode and output commands to the deployable drone 105 that instruct the deployable drone 105 to operate in the panic mode.

The commands to operate in the selected mode may further include commands for the deployable drone 105 to present various perceptible alerts associated with the selected operating mode, the user input, etc. For instance, in response to receiving the alert signal instructing the deployable drone 105 to operate in the panic mode, the processor 155 may output command signals instructing the deployable drone 105 to hover above the host vehicle 100, shine a light 120 toward the host vehicle 100, and turn on the siren. Other perceptible alerts, or groups of perceptible alerts, may be associated with other operating modes. For instance, shining the light 120 onto the host vehicle 100 (but not turning on the siren) is associated with the security mode. Some operating modes do not include any perceptible alerts. In some possible implementations, the processor 155 may be programmed to output commands instructing the deployable drone 105 to present the perceptible alert independent of any particular operating mode. That is, the processor 155 may be programmed to instruct the deployable drone 105 to shine the light 120 on the host vehicle 100, turn on the siren, etc., in response to receiving an alert signal requesting as much.

The command signals may include commands for the deployable drone 105 to follow the host vehicle 100 (i.e., follow commands). The follow commands may include the processor 155 instructing the navigation system 140 to periodically determine the location of the host vehicle 100 and instructing the communication interface 130 to periodically (e.g., each time the location of the host vehicle 100 is determined by the navigation system 140) transmit the location of the host vehicle 100 to the deployable drone 105. The follow commands may further include commanding the communication interface 130 to transmit instructions to the deployable drone 105 to follow the host vehicle 100 according to the location determined by the navigation system 140.

The processor 155 may be further programmed to command the communication interface 130 to send messages to the remote server 115 associated with the emergency service provider. For instance, in response to receiving an alert signal requesting the deployable drone 105 to operate in the panic mode or the security mode, the processor 155 may command the communication interface 130 to transmit the location of the host vehicle 100, as determined by the navigation system 140, to the remote server 115. By doing so, the emergency service provider may be able to dispatch an emergency vehicle to the location of the host vehicle 100. The driver of the emergency vehicle will be able to easily identify the host vehicle 100 with the drone hovering over the host vehicle 100, shining a light 120 on the host vehicle 100, and possibly blaring the siren.

Figure 3:
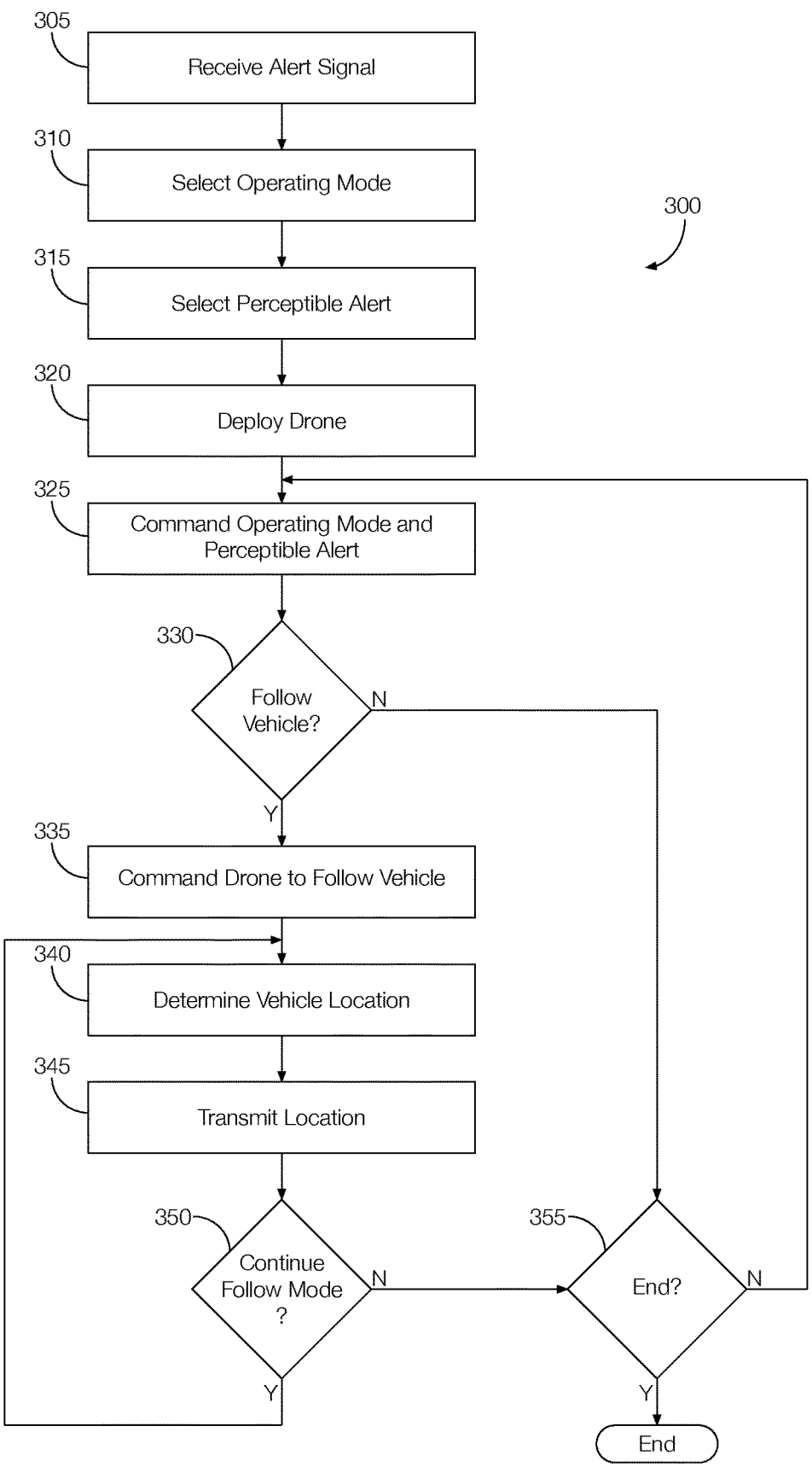
FIG. 3 is a flowchart of an example process that may be executed by the drone deployment system to deploy the drone.

FIG. 3 is a flowchart of an example process 300 that may be executed by the drone deployment system 110 to deploy the drone from the host vehicle 100 and output various signals to control the drone.

At block 305, the drone deployment system 110 receives an alert signal. The alert signal may be received at the host vehicle 100 by the communication interface 130 and forwarded to the processor 155 or transmitted from, e.g., an in-vehicle infotainment system to the processor 155 without an intervening remote server 115. The alert signal, as discussed above, may be generated in response to a user input, which could include a user input from the owner of the host vehicle 100 or from an emergency service provider.

At block 310, the drone deployment system 110 may select an operating mode of the deployable drone 105. Example modes may include the panic mode, the security mode, the static view mode, the monitoring mode, and the fly mode, all of which are discussed above. The processor 155 may select the operating mode in accordance with the alert signal. For instance, if the alert signal indicates the vehicle owner's desire for the deployable drone 105 to operate in the panic mode, the drone deployment system 110 may select that mode.

At block 315, the drone deployment system 110 may select the perceptible alert. Some perceptible alerts are associated with particular modes. Therefore, the processor 155 may select the perceptible alert according to the operating mode selected at block 310. For instance, if the panic mode is selected at block 310, the processor 155 may select shining the light 120 and turning on the siren as two perceptible alerts since those two alerts as associated with the panic mode.

At block 320, the drone deployment system 110 may deploy the deployable drone 105. To deploy the deployable drone 105, the processor 155 may output signals to the deployment actuators 145, the trunk, or both, to release the deployable drone 105 and allow the deployable drone 105 to fly out of the host vehicle 100.

At block 325, the drone deployment system 110 may command the deployable drone 105 to operate in the mode selected at block 310 and to present the perceptible alert selected at block 315. The processor 155 may command the communication interface 130 to transmit the command signals to the deployable drone 105 either before or after the drone is freed from the host vehicle 100 at block 320. Thus, block 325 may occur simultaneously with block 320. That is, the command signals instructing the deployable drone 105 to leave the host vehicle 100 may also serve as the command signals for the deployable drone 105 to operate in a particular operating mode, present particular perceptible alerts, or both.

At decision block 330, the drone deployment system 110 may determine whether the deployable drone 105 should follow the host vehicle 100. The processor 155 may make this decision based on the operating mode selected at block 310. For instance, if the monitoring mode is selected at block 310, the processor 155 may determine that the deployable drone 105 should follow the host vehicle 100. Alternatively, the decision for the deployable drone 105 to follow the host vehicle 100 may be based on a request from an emergency service provider received via the remote server 115. If the processor 155 determines that the deployable drone 105 should follow the host vehicle 100, the process 300 may proceed to block 335. Otherwise, the process 300 may proceed to block 355.

At block 335, the drone deployment system 110 may command the drone to follow the host vehicle 100. Commanding the drone to follow the host vehicle 100 may include the processor 155 transmitting a follow command to the deployable drone 105. The follow command may instruct the deployable drone 105 to navigate to locations that will be provided by the processor 155 via, e.g., the communication interface 130. In some instances, the follow command may be transmitted at block 320 with the signals commanding the deployable drone 105 to operate in a particular operating mode, as discussed above.

At block 340, the drone deployment system 110 may determine the location of the host vehicle 100. For instance, the processor 155 may determine the location of the host vehicle 100 from, e.g., the navigation system 140. The location of the host vehicle 100 may be determined periodically. For instance, block 340 may be executed multiple times during the process 300. The location of the host vehicle 100 may be determined every time block 340 is executed.

At block 345, the drone deployment system 110 may transmit the location of the host vehicle 100 to the deployable drone 105, the remote server 115, or both. The processor 155 may command the communication interface 130 to transmit the location of the host vehicle 100 to the deployable drone 105, the remote server 115, or both each time a new location of the host vehicle 100 is determined at block 340. The location of the host vehicle 100 may be transmitted to the deployable drone 105 when the deployable drone 105 is operating in the monitoring mode. The location of the host vehicle 100 may be transmitted to the remote server 115 in response to a request, included in the alert signal, from the emergency service provider.

At decision block 350, the drone deployment system 110 may determine whether to continue the follow mode. That is, the processor 155 may determine whether to continue the follow mode based on a user input requesting a different operating mode (e.g., an operating mode other than the monitoring mode), a signal from the remote server 115 indicating that the emergency service provider no longer needs the drone to operate in the follow mode, or the like. If the processor 155 determines to continue with the follow mode, the process 300 may proceed to block 340 so that the present location of the host vehicle 100 can be determined and transmitted to the deployable drone 105, the remote server 115, or both. If the processor 155 decides to cease the follow mode, the process 300 may proceed to decision block 355.

At decision block 355, the drone deployment system 110 may determine whether the process 300 should end. For instance, the processor 155 may determine whether additional use of the deployable drone 105 is desired from the owner of the host vehicle 100 or the emergency service provider. This may include receiving a new alert, selecting a new operating mode, selecting a new perceptible alert, etc., before proceeding to block 325. If additional use of the deployable drone 105 is needed, the process 300 may proceed to block 325 so that the deployable drone 105 may be commanded to operate in a particular operating mode, present a particular perceptible alert, or both. If additional use of the deployable drone 105 is not desired, the process 300 may end after block 355.

According to the process 300, the deployable drone 105 may hover above the host vehicle 100 and shine a light 120 onto the host vehicle 100, turn on a siren, or provide any other type of perceptible alert. Thus, the drone will draw attention to the host vehicle 100, making the host vehicle 100 easier for emergency service personnel or, e.g., a tow truck driver, to find.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory 150, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising a processor and a memory storing instructions executable by the processor, the instructions including:
   receiving an alert signal;
   deploying a drone from a host vehicle in response to receiving the alert signal;
   selecting an operating mode in accordance with the alert signal from among a plurality of operating modes including at least a panic mode and a security mode;
   commanding the drone to follow the host vehicle and to present a perceptible alert; and
   selecting the perceptible alert according to the selected operating mode;
   wherein, in the panic mode, the perceptible alert includes turning on a siren; and
   in the security mode, the perceptible alert includes shining a light on the host vehicle.

2. The vehicle system of claim 1, wherein the alert signal is received at the host vehicle via a user input provided to a user interface incorporated into the host vehicle.

3. The vehicle system of claim 1, wherein the alert signal is received via at the host vehicle via a communication interface in wireless communication with a remote server.

4. The vehicle system of claim 3, wherein the remote server is associated with an emergency service provider.

5. The vehicle system of claim 1, the instructions further including:
   determining a location of the host vehicle; and
   commanding a communication interface to wirelessly transmit the location of the host vehicle to a remote server associated with an emergency service provider.

6. The vehicle system of claim 1, the instructions further including:
   commanding a communication interface to transmit a follow command to the drone, the follow command including instructions for the drone to follow the host vehicle;
   periodically determining a location of the host vehicle; and
   commanding the communication interface to transmit the location of the host vehicle to the drone each time the location of the host vehicle is determined.

7. The vehicle system of claim 1, wherein in the panic mode, the perceptible alert further includes shining the light on the host vehicle.

8. The vehicle system of claim 1, wherein in the security mode, the perceptible alert includes only shining the light on the host vehicle.

9. The vehicle system of claim 1, wherein the operating modes further includes a static view mode, and the instructions include, in the static view mode, commanding the drone to follow the host vehicle without presenting a perceptible alert.

10. A method comprising:
    receiving an alert signal at a host vehicle;
    deploying a drone from the host vehicle in response to receiving the alert signal;
    selecting an operating mode in accordance with the alert signal from among a plurality of operating modes including at least a panic mode and a security mode;
    commanding the drone to follow the host vehicle and to present a perceptible alert; and
    selecting the perceptible alert according to the selected operating mode;
    wherein, in the panic mode, the perceptible alert includes turning on a siren; and
    in the security mode, the perceptible alert includes shining a light on the host vehicle.

11. The method of claim 10, wherein the alert signal is received at the host vehicle via a user input provided to a user interface incorporated into the host vehicle.

12. The method of claim 10, wherein the alert signal is received via at the host vehicle via a communication interface in wireless communication with a remote server.

13. The method of claim 12, wherein the remote server is associated with an emergency service provider.

14. The method of claim 10, the instructions further including:
    determining a location of the host vehicle; and
    commanding a communication interface to wirelessly transmit the location of the host vehicle to a remote server associated with an emergency service provider.

15. The method of claim 10, the instructions further including:
    commanding a communication interface to transmit a follow command to the drone, the follow command including instructions for the drone to follow the host vehicle;
    periodically determining a location of the host vehicle; and
    commanding the communication interface to transmit the location of the host vehicle to the drone each time the location of the host vehicle is determined.

16. The method of claim 10, wherein in the panic mode, the perceptible alert further includes shining the light on the host vehicle.

17. The method of claim 10, wherein in the security mode, the perceptible alert includes only shining the light on the host vehicle.

18. The method of claim 10, wherein the operating modes further includes a static view mode, and the instructions include, in the static view mode, commanding the drone to follow the host vehicle without presenting a perceptible alert.

19. A vehicle system comprising:
    a drone, deployable from a host vehicle, including a light source and a siren;
    a communication interface programmed to wirelessly receive an alert signal from a remote server associated with an emergency service provider; and
    a processor programmed to receive the alert signal from the communication interface, deploy the drone from the host vehicle in response to receiving the alert signal, select an operating mode in accordance with the alert signal from among a plurality of operating modes including at least a panic mode and a security mode, command the drone to follow the host vehicle and to present a perceptible alert, and selecting the perceptible alert according to the selected operating mode;
    wherein, in the security mode, the perceptible alert includes shining the light source on the host vehicle; and
    in the panic mode, the perceptible alert includes turning on the siren.

20. The vehicle system of claim 19, wherein in the panic mode, the perceptible alert further includes shining the light on the host vehicle, and in the security mode, the perceptible alert includes only shining the light on the host vehicle.

* * * * *